July 24, 1956  W. GERSTENBERGER  2,755,870
HYDRAULIC BOOSTER CONTROL OF HELICOPTER BLADE PITCH
Filed Sept. 26, 1950  3 Sheets-Sheet 1

INVENTOR
WALTER GERSTENBERGER
BY M. B. Tasker
ATTORNEY

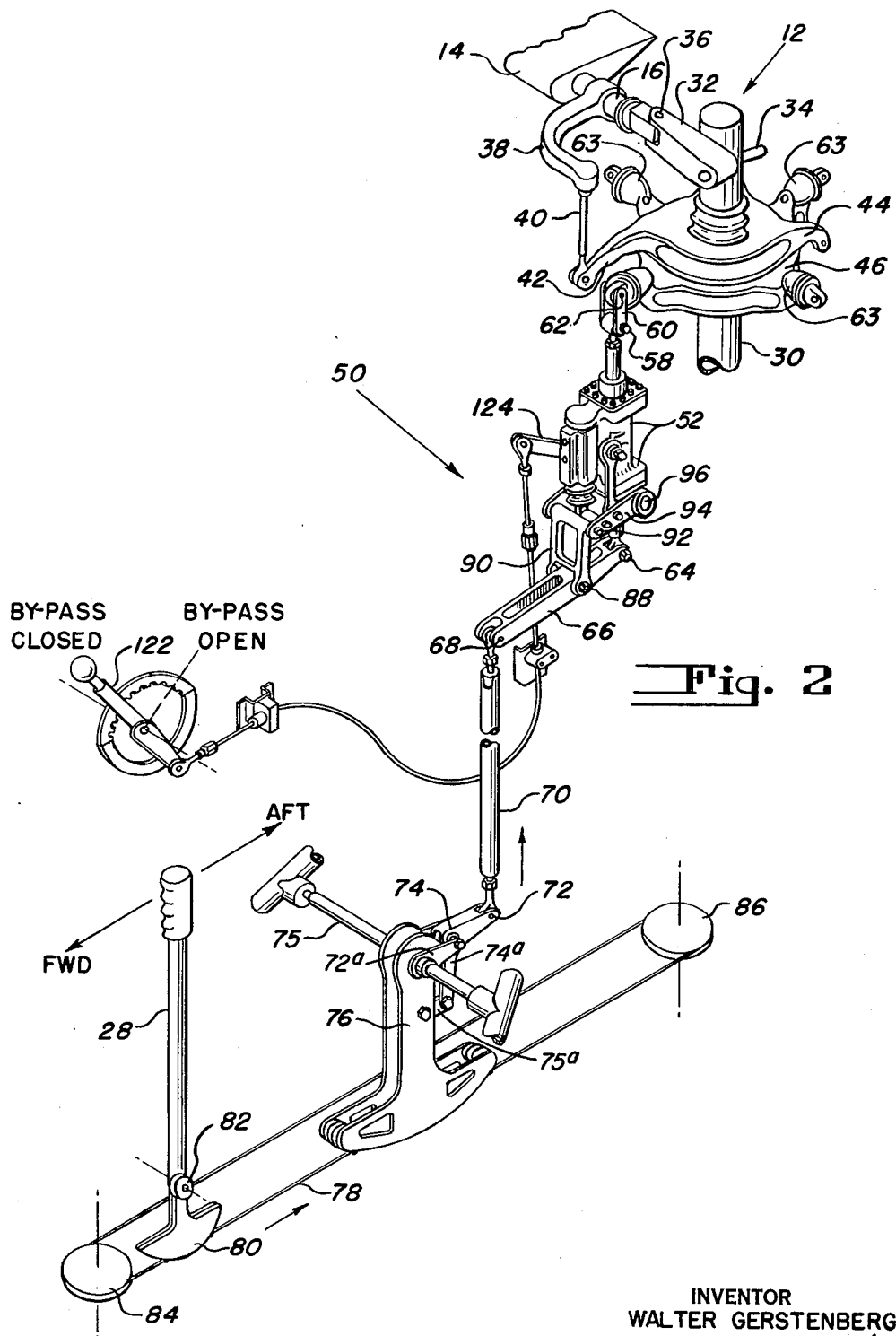

July 24, 1956 W. GERSTENBERGER 2,755,870
HYDRAULIC BOOSTER CONTROL OF HELICOPTER BLADE PITCH
Filed Sept. 26, 1950 3 Sheets-Sheet 3
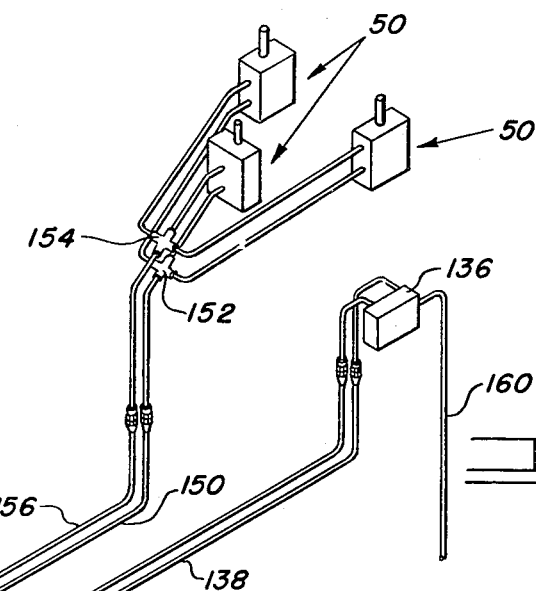
Fig. 4.
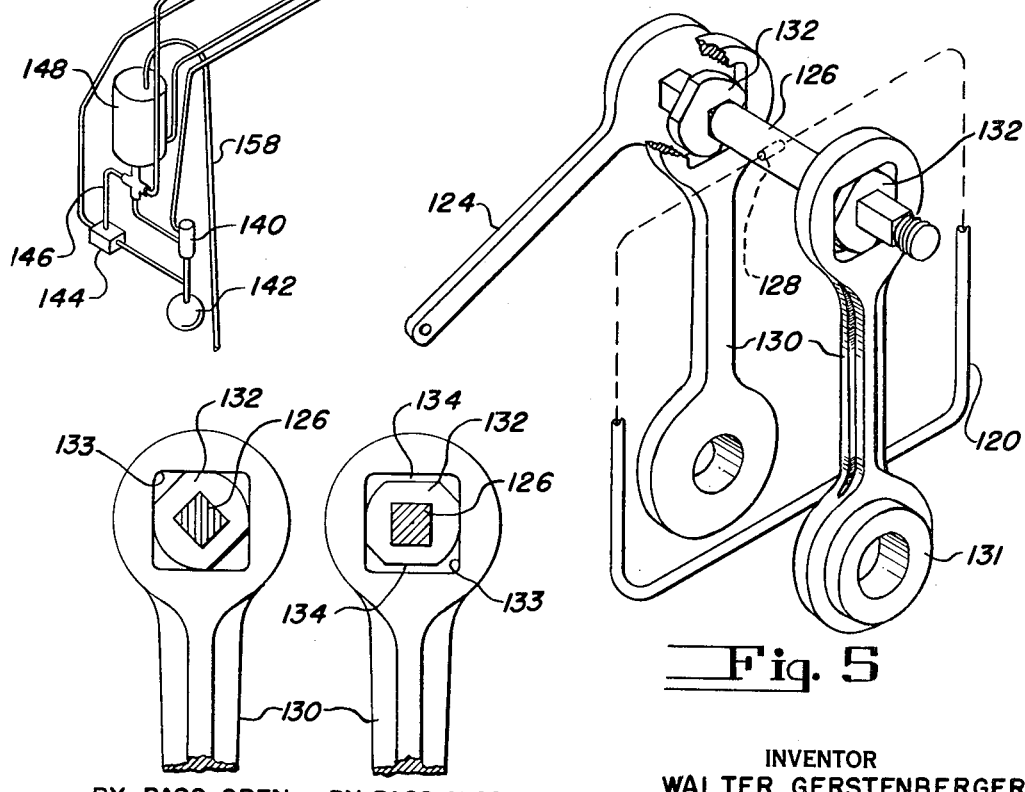
Fig. 5
BY-PASS OPEN BY-PASS CLOSED
Fig. 6
INVENTOR
WALTER GERSTENBERGER
BY M. B. Tasker
ATTORNEY United States Patent Office 2,755,870
Patented July 24, 1956

2,755,870

HYDRAULIC BOOSTER CONTROL OF HELICOPTER BLADE PITCH

Walter Gerstenberger, Stratford, Conn., assignor to United Aircraft Corporation, East Hartford, Conn., a corporation of Delaware Application September 26, 1950, Serial No. 186,744

6 Claims. (Cl. 170—160.25)

This invention relates to helicopters of the type in which the rotor blades are pivotally mounted on a hub for flapping and coning movement and for pitch changing movement about their longitudinal axes and in which the directional control of the helicopter is obtained by varying the pitch of the blades either collectively or cyclically by movements of a swash plate mechanism. The invention is particularly concerned with an improved servomotor, or boost mechanism, for moving the swash plate in response to movements of the primary controls by the pilot.

It is an object of the present invention to provide an improved control system including power operated means arranged to relieve the pilot of the dynamic and aerodynamic loads and vibrations originating in the rotor blades and to effect movement of the swash plate to control the helicopter with a minimum of force applied to the pilot's controls.

A further object of the invention is to provide an improved servo control mechanism of this type in which the pilot can instantly override the servomotor with his manual controls in the event that the servo mechanism for any reason fails in service.

It is a further object of the invention to provide means for disabling the servomotor mechanism completely at the will of the pilot.

A still further object of the invention is the provision of means responsive to the maintenance of fluid pressure in the servo system for disabling the servo mechanism automatically in the event of failure of fluid pressure in the system.

A further object of the invention is generally to improve helicopter control systems.

These and other objects and advantages of the invention will become apparent in connection with the detailed description of two typical embodiments of the invention shown in the accompanying drawings.

In these drawings:

Fig. 2 is an enlarged detail view of the control mechanism for the swash plate of the helicopter shown in Fig. 1;

Fig. 4 is a somewhat simplified diagrammatic illustration of the hydraulic system for the servomotor mechanism.

Fig. 5 is a greatly enlarged detail of a manually controlled device for disabling the servo mechanism to permit manual operation of the control mechanism;

Fig. 6 is a detailed view showing two positions of a lost motion connection in the device of Fig. 5.

Figure 1:
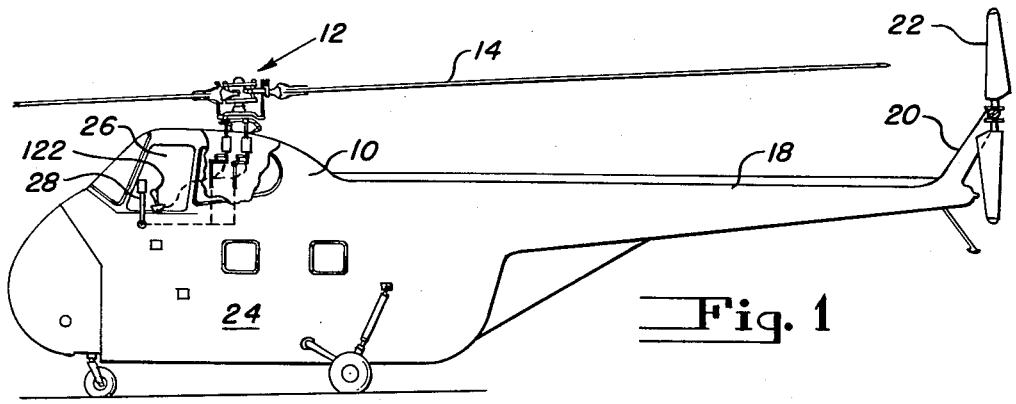
Fig. 1 is a side elevation of a helicopter embodying one form of the invention with a part of the fuselage in the vicinity of the rotor head broken away.

As herein shown in Figs. 1 and 2, the helicopter embodying the invention includes a fuselage 10 which supports a rotor head generally indicated at 12 on which a plurality of blades 14, herein three, are pivotally mounted for flapping and coning movement and also for movement about their longitudinal pitch changing axes 16. The helicopter also includes a tail cone 18 terminating in a pylon 20 on which a tail rotor 22 is mounted for rotation about a generally horizontal axis. The fuselage 10 has a passenger or cargo carrying compartment 24 beneath the rotor head and a pilot's compartment 26 immediately forward of the rotor head in which the usual pilot's controls are provided. As shown in Fig. 2 these may include the usual pivoted pilot's cyclic pitch control stick 28 by which fore and aft and lateral tilting of the swash plate is effected. However, for the sake of clarity the lateral control linkages have been omitted. A usual collective pitch control stick (not shown) may also be provided.

As shown somewhat diagrammatically in Fig. 2, the rotor drive shaft 30 carries a flapping link 32 for each blade 14 which is pivoted on a horizontal hinge 34 to a rotor hub fixed to the upper end of the shaft. The root portion of each blade is mounted for movement in its plane of rotation about a drag hinge 36 and, as previously stated, is journalled for pitch changing movement about its longitudinal axis. Each blade also carries a horn 38 which is connected by a link 40 to one of three outstanding arms 42 on a rotatable swash plate member 44 which is journalled on a satationary swash plate member 46. The stationary swash plate member 46 is carried by rotor shaft 30, or by fixed structure of the helicopter and is mounted for universal tilting movement about a universal joint in a usual manner.

Figure 3:
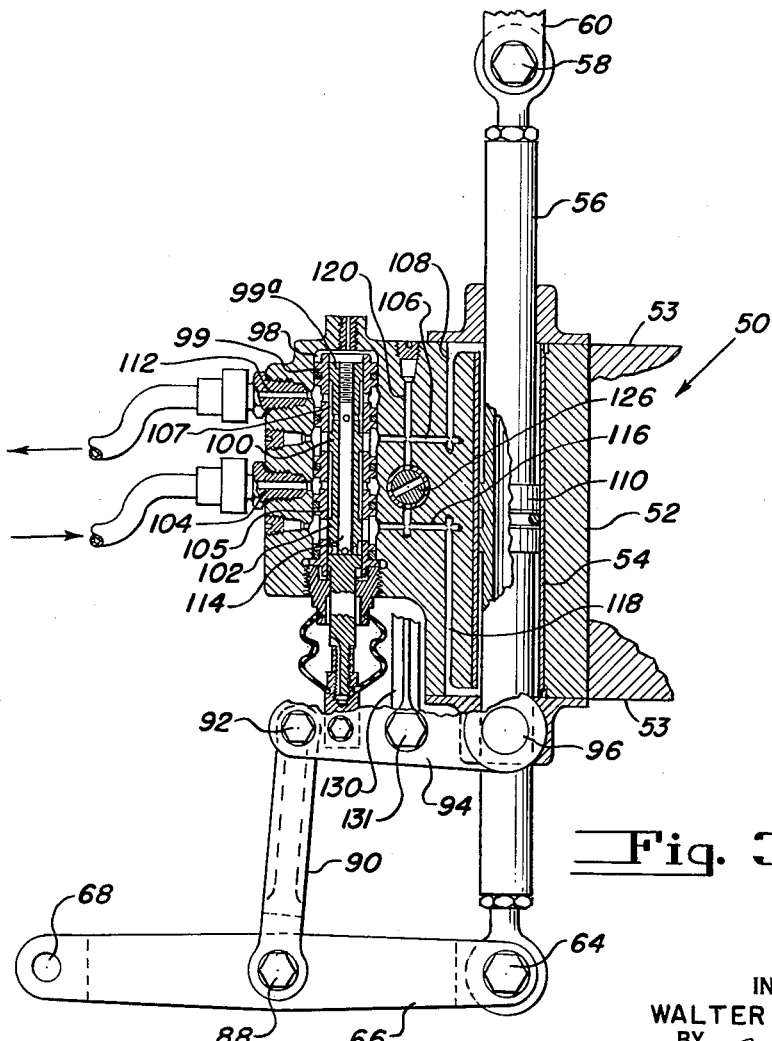
Fig. 3 is a vertical section through the servomotor and its control valve.

The servo mechanisms are generally indicated at 50 and each includes a casing 52 (Fig. 3) carried by fixed structure 53 of the helicopter and having a cylinder 54 in which a servo piston rod 56 reciprocates. The upper end of piston rod 56 is pivotally connected at 58 to a pair of links 60 which in turn are pivotally connected at 62 to one of the four bosses 63 which are equally spaced about the periphery of the stationary swash plate member 46 as is shown most clearly in Fig. 2. It will be understood that a servomotor is connected to each of three of the bosses 63. The fourth boss is connected to a scissors linkage for holding the swash plate 46 against rotation. In Fig. 2, only one of the three servo mechanisms is shown (three being necessary for collective pitch control), it being understood that the others are identical. Also the linkage connecting this single servo mechanism with the control stick is shown only diagrammatically, since the stick 28 and the manually operable linkage connecting it with the swash plate is well known in the art, with the exception of the servo mechanisms included therein. The lower end of piston rod 56 of the servo mechanism shown is pivotally connected at 64 to one end of a generally horizontal lever 66, the opposite end of which is pivoted at 68 to the upper end of an operating rod 70. The lower end of rod 70 is pivoted at 72 to a crank arm 74 of a bell crank rotatably mounted on a pair of aft extending arms 72a fixed to shaft 75 which is journalled on fixed structure, the other arm 74a of which is operated by a short link 75a pivoted to a depending link 76 pivotally mounted on shaft 75 and having a cable 78 fixed thereto and also fixed to the segment 80 on the lower end of the pilot stick 28 which is pivoted at 82, suitable pulleys 84 and 86 being provided for the support of the cable 78. The total pitch control (not shown) would for example be connected to rotate shaft 75 and thereby move all three of the control rods 70 for the several servomotors in unison independently of the position of control stick 28. From the above description it will be evident that the control linkage chosen for illustration in Fig. 2 is that which responds to fore and aft movements of stick 28.

The lever 66 is pivotally supported intermediate its ends at 88 on a link 90 the upper end of which is pivoted at 92 to the free ends of a pair of spaced levers 94 which are pivotally mounted on the fixed casing 52 of the servo mechanism at 96. A valve 93 for the servo mechanism is located in cylinder 98 in casing 52 and includes a ported casing member 99 in which a valve member 99a reciprocates. Valve member 99a carries vertically spaced lands 100 and 102 which control the flow of hydraulic fluid from a fluid inlet connection 104 and a central annular chamber 105 through communicating passages 106 and 108 to the upper side of the servo piston 110 and through interconnecting passages 116 and 118 with the under side of the piston 110.

Fluid is vented from above the piston 110 through passages 108, 106, annular passage 107 and outlet connection 112 while fluid from below piston 110 is vented through passages 118, 116, central passage 114 to annular passage 107 to outlet passage 112.

The casing 52 of the servomotor also has a passage 120 which connects passages 106 and 116 to by-pass the valve 93 at the will of the pilot. This passage 120 is controlled by a pilot operated lever 122 located in the cockpit which is operatively connected by a teleflex cable to a valve arm 124 (Fig. 5) of a rotary valve 126 which is journalled in the housing 52 of the servomotor. Valve 126 has a valve passage 128 which when it occupies the position shown in Fig. 3, closes the passage 120. By the movement of the valve 126 through about 90° the passage 128 shown diagrammatically in Fig. 5 is brought into register with the passage 120 thus permitting fluid communication between opposite sides of the piston 110.

It will be evident that during operation of the valve 93 the lever 66 moves about the pivot 64 which, due to the fluid on opposite sides of piston 110 in the servomotor, acts as a fixed pivot. Provision is made, however, for the manual operation of the piston rod 56 of the servomechanism when the by-pass controlled by valve passage 126 is open while still permitting operation of the valve 93 when the by-pass is closed. To this end a pair of "sloppy" links 130 (Fig. 5) are provided which are pivoted at their lower ends at 131 to the arms of spaced levers 94 intermediate the ends of the latter. Links 130 have square apertures 133 in their upper ends which receive cams 132 carried by square sectioned portions of valve 126 and hence rotatable therewith. As shown most clearly in Fig. 6, when the by-pass valve 128 is closed the cams 132 permit a limited amount of vertical movement of the links 130 in either vertical direction due to the space between the longer flat parallel faces 134 of the cams 132 and the corresponding parallel margins of the square apertures 133. When the valve 126 is rotated to open the by-pass passage 120, the links 130 become rigid struts between levers 94 and casing 52 since in this position of valve 126 the cams 132 completely occupy the square openings 133 so as to prevent movement of the links 130 in either vertical direction. Movement of lever 66 by rod 70 under these conditions results in moving lever 66 about pivot 88 as a fixed pivot to move the piston rod 56 directly from the pilot's control stick.

The hydraulic system is shown diagrammatically in Fig. 4. A hydraulic pump 136 is driven by the rotor in power-off operation or by the engine in power-on operation from the main gearbox so that the pump will be operated to maintain hydraulic pressure so long as the rotor continues to rotate, irrespective of engine failures. Pressure fluid from the pump is supplied through a conduit 138 to an unloading valve 140 which cuts in at 800 lbs. per square inch and cuts out at 1,000 lbs. per square inch. From the unloading valve pressure fluid flows to accumulator 142 and from 142 to servo relief valve 144 set at 1,200 lbs. per square inch which is connected through a relief passage 146 with a vented oil reservoir 148. From the relief valve the pressure fluid flows through a conduit 150 to a three-way fitting 152 from which the fluid is delivered to the three servomechanisms 50. At the same time fluid is vented from these servomechanisms through a three-way fitting 154 from which it flows through a conduit 156 back to reservoir 148. The reservoir 148 is provided with an overboard drain conduit 158 and pump 136 is provided with a similar conduit 160.

In the operation of this form of the invention, forward movement of the stick 28 by the pilot will result in an upward thrust on lever 66 by rod 70 as indicated by the arrows in Fig. 2. Since the valve 93 of the servomotor 50 is centered and the cylinder on opposite sides of the piston 110 is full of fluid, lever 66 will move in a clockwise direction about the pivot 64 as a fixed pivot since lever 122 (Fig. 2) is in the up "servo" position in which valve 126 is closed, and cams 132 are in the "By-pass Closed" position shown in the right hand portion of Fig. 6. The levers 94 are thus free to move upwardly under the thrust of connecting link 90 to move the valve 93 upwardly since cams 132 are loose in apertures 133. This results in admitting pressure fluid through the inlet 104 and annular passage 105 (Fig. 3) past upper land 100 and through passages 106 and 108 into the cylinder above piston 110 resulting in downward movement of the piston rod 56 and downward and forward tilting of the swash plate members to apply cyclic pitch to the blades 14 such as to effect forward flight of the helicopter.

It will be evident that as soon as the valve 93 has moved a small distance sufficient to admit fluid to the relatively small volume cylinder above piston 110, the resulting downward movement of the piston rod 56 will then move the lever 66 in a clockwise direction about pivot 68 as a fixed pivot, since this pivot is held fixed by the pilot in the new position of the stick. This clockwise movement of lever 66 will thus adjust the valve 93 downwardly to its mid position in which fluid flow to the piston of the servomotor is cut off, leaving the piston rod 56 and the attached swash plate in the desired position corresponding to the position in which the pilot has placed the stick. The parts will remain in this position until the pilot initiates a new operation of the mechanism by again moving the stick. It will be noted that following a movement of the swash plate by the servomechanism, during which movement the valve 93 is again centered, the piston rod 56, due to the entrapped fluid on opposite sides of piston 110, holds the linkage rigidly against movement by forces fed back from the rotor blades into the controls, thus protecting the pilot from vibrations and damping these vibrations which are now taken up by the fixed structure of the helicopter close to their origin. This prevents the loads being transmitted into the control linkages and eliminates the fatiguing of parts thereof.

Movement of the stick in an aft direction will reverse the control. Thus aft movement of the stick will result in downward movement of rod 70 to rock lever 66 counterclockwise about pivot 64 and effect downward movement of the valve 93 to admit fluid under pressure from annular passage 105 past lower land 102 into passages 116 and 118 to the under side of piston 110 which will move piston rod 56 up and tilt the swash plate to cause the helicopter to fly aft. It will be evident that during admission of fluid on either side of piston 110 of the servomotor the fluid on the opposite side will be vented through the fluid outlet connections in a usual manner.

It will be evident that when the servomechanism is in use the pilot is not only relieved of vibrations which were formerly transmitted back to the stick from the rotor blades and from steady loads which formerly required him to exert pressure against the stick to hold the stick in a selected position, but also he is never required to exert a greater force than is necessary to move the linkage up to and including the valve 93.

It will also be evident that the movement required to move the valve 93 is very small since it can never exceed the distance between the flat surfaces 134 on the cam 132 and the parallel margin of the aperture 131. However, in the event that something is wrong with the servo mechanism, the pilot can move the swash plate manually just as he always did prior to the installation of the servo mechanism. Under these circumstances, when the small movement ordinarily required to move the valve 93 has been accomplished, the lost motion between the upper ends of links 130 and the valve stem 126 is used up and links 130 act as struts to prevent further movement of levers 94. This will result in movement of lever 66 about pivot 88 to move the piston rod 56 in the desired direction. This emergency manual operation of the swash plate members can be carried out instantly simply by the exertion of sufficient force on the stick to effect the desired movement of the swash plate without the benefit of the servo mechanism. This overriding movement is possible since the initial movement of the controls unlocks the piston 110 by moving the valve 93 to permit flow of fluid to and from the cylinder on opposite sides of the piston 110. If the hydraulic pressure in the system drops below the required pressure, any load the pilot applies to the control system will be additive to the force exerted by the hydraulic system.

To condition the control system for manual operation, aside from the emergency manual operation above described, the pilot merely moves the lever 122 clockwise (Fig. 2) which, through the teleflex cable, moves the lockout lever 124 down. Lever 124 has a square hole which receives the squared portion of valve 126. This rotation of the valve 126 by lever 124 not only opens the by-pass passage 120 by moving valve passage 128 into alignment with passage 120 (Fig. 3) but it also rotates the cams 132 into the "By-pass Open" position illustrated in the left-hand view of Fig. 6, thus locking levers 94 rigidly to the valve casing 52. This makes the pivot 88 a fixed pivot about which lever 66 pivots to reciprocate the piston rod 56 which now acts as a mere mechanical link in the linkage between the stick and the stationary swash plate member. Any lost motion in the control system is eliminated. The piston rod 56 in this position of the valve 126 moves free of the fluid in the servo mechanism since free fluid communication has been established between the opposite sides of piston 110.

In the form of the invention described above it will be noted that the servomotor piston rod 56 is in tandem with the control linkage between the stick and the stationary swash plate member i. e. rod 56 comprises one link of the manually operable linkage between the stick and the stationary swash plate member.

It will be evident that as a result of this invention improved means have been provided for not only operating the swash plate by hydraulic means to relieve the pilot, but that such means has also been provided having the hydraulically operated element thereof directly connected to the stationary swash plate member to prevent vibrations and other aerodynamic forces originating in the rotor blades from being transmitted back to the stick.

It will also be evident that improved means has been provided by which the pilot valve can instantly override the hydraulic servo mechanism in the event of failure of the latter as well as an improved means for either manually or automatically conditioning the mechanism for manual operation in the event of such failure.

While one embodiment of the invention has been shown and described herein, it will be evident that various changes may be made in the construction and arrangement of the parts without departing from the scope of the invention.

I claim:

1. In a rotary wing aircraft having blades pivoted for pitch changing movement about their longitudinal axes, means for controlling the pitch of said blades including rotatable and non-rotatable swash plate members, pilot operative means having an operative connection with said non-rotatable member, hydraulic means providing power operation of said pitch control means including servo motor mechanism having cooperating cylinder and piston elements, one of which elements is carried by fixed structure of the aircraft and the other of which is connected to said non-rotatable swash plate member, a source of fluid under pressure, a valve having an operative connection with said pilot operative means for metering hydraulic fluid to said servomotor, and manually operable means including a by-pass valve for establishing fluid communication between opposite sides of said servo piston and for locking said hydraulic metering valve against movement by said pilot operative means.

2. In a rotary wing aircraft having blades pivoted for pitch changing movement about their longitudinal axes, means for controlling the pitch of said blades collectively and cyclically including rotatable and non-rotatable swash plate members, servo mechanism including a servo piston having its upper end connected to said non-rotatable swash plate member and having its lower end connected to a generally horizontal lever, a pilot operative member operatively connected to the other end of said lever, a second lever pivotally mounted adjacent one end on fixed structure of said aircraft and having means connecting it at its free end to said horizontal lever intermediate the ends of the latter, a valve for metering hydraulic fluid to opposite sides of said servo piston connected to said second lever adjacent its free end, a strut member pivotally connected at its lower end to said second lever intermediate the ends of the latter, said strut member having a non-circular aperture at its upper end provided with parallel sidewalls, passage means establishing fluid communication between opposite sides of said servo piston, and a valve for controlling said passage means having cam means thereon located in said non-circular aperture, said cam means having opposed locking surfaces which are disposed adjacent said parallel sidewalls of said aperture in the closed position of said valve means, in which position said strut and said hydraulic metering valve are free to move through a limited vertical distance defined by the space between the upper and lower surfaces of said aperture and said locking cam surfaces, said locking surfaces in the open position of said valve means engaging the upper and lower surfaces of said aperture and completely occupying the vertical limits of said aperture, whereby said strut and said hydraulic metering valve are locked against movement and said servo piston is free to move as said horizontal lever moves about its intermediate pivot.

3. In a rotary wing aircraft having blades pivoted for pitch changing movement about their longitudinal axes, means for controlling the pitch of said blades including a swash plate device having rotatable and non-rotatable members, pilot operable means, said pilot means having a lever, said pilot operable means including an operating member connected adjacent one end of said lever, a servomotor mechanism adjacent said swash plate device having cooperating cylinder and piston elements, one of said elements being carried by fixed structure of the aircraft, the other of said elements having one end connected to said non-rotatable member and the other end connected to said lever at a point spaced from the connection of said operating member, a source of fluid under pressure, valve means being operatively connected with said lever for directing fluid to one side of said piston element and from the other side for controlling the movement of the element connected to said non-rotatable member and said non-rotatable member, and means including a by-pass valve for establishing fluid communication between opposite sides of said piston and for locking said valve means against movement by said pilot operable means.

4. In a rotary wing aircraft having blades pivoted for pitch changing movement about their longitudinal axes, means for controlling the pitch of said blades including a swash plate device having rotatable and non-rotatable members, pilot operable means, said pilot means having a lever, said pilot operable means including an operating member connected adjacent one end of said lever, a servomotor mechanism adjacent said swash plate device having cooperating cylinder and piston elements, one of said elements being carried by fixed structure of the aircraft, the other of said elements having one end connected to said non-rotatable member and the other end connected to said lever at a point spaced from the connection of said operating member, a source of fluid under pressure, valve means being operatively connected with said lever for directing fluid to one side of said piston element and from the other side for controlling the movement of the element connected to said non-rotatable member and said non-rotatable member, means including a by-pass valve for establishing fluid communication between opposite sides of said piston and for determining a new point of rotation of said lever so that a movement of said operating member will be transmitted to said element connected to said lever.

5. In a rotary wing aircraft having blades pivoted for for pitch changing movement about their longitudinal axes, means for controlling the pitch of said blades including a swash plate device having rotatable and non-rotatable members, pilot operable means, said pilot operable means having a lever, said pilot operable means including an operating member connected to said lever, a servomotor mechanism adjacent said swash plate device having cooperating cylinder and piston elements, one of said elements being carried by fixed structure of the aircraft, the other of said elements having one end connected to said non-rotatable member and the other end connected to said lever, a source of fluid under pressure, and valve means for directing fluid to one side of said piston element and from the other side, a second lever having one end pivoted to fixed structure of the aircraft, a link connecting said second lever to said first named lever, said valve means being operatively connected with said second lever, means for establishing fluid communication between opposite sides of said piston element and connecting said second named lever at another point with fixed structure providing a direct operative connection between said operating member and said non-rotatable member.

6. In a rotary wing aircraft having blades pivoted for pitch changing movement about their longitudinal axes, means for controlling the pitch of said blades including a swash plate device having rotatable and non-rotatable members, pilot operable means, said pilot operable means having a lever, said pilot operable means including an operating member connected adjacent one end of said lever, a servomotor mechanism adjacent said swash plate device having cooperating cylinder and piston elements, one of said elements being carried by fixed structure of the aircraft, the other of said elements having one end connected to said non-rotatable member and the other end connected adjacent the other end of said lever, a source of fluid under pressure, and valve means for directing fluid to one side of said piston and from the other side, a second lever having one end pivoted to fixed structure of the aircraft, a link connecting said second lever to said first named lever between the points where the element and member are connected, said valve means being operatively connected with said second lever between the points where the link and fixed structure are connected, means for rigidly fixing the second lever and for connecting one side of said piston element to the other to permit free movement of said element connected to said non-rotatable member.

References Cited in the file of this patent

UNITED STATES PATENTS

| | | |
|---|---|---|
| Re. 22,595 | Upson | Jan. 23, 1945 |
| 2,284,298 | Newton | May 26, 1942 |
| 2,389,274 | Pearsall et al. | Nov. 29, 1945 |
| 2,395,671 | Kleinhans et al. | Feb. 26, 1946 |
| 2,405,188 | Campbell | Aug. 6, 1946 |
| 2,424,901 | Richolt | July 29, 1947 |
| 2,437,536 | Johnson et al. | Mar. 9, 1948 |
| 2,443,192 | Moeller | June 15, 1948 |
| 2,479,549 | Ayers et al. | Aug. 23, 1949 |
| 2,521,012 | Kay et al. | Sept. 5, 1950 |
| 2,590,716 | Lisle | Mar. 25, 1952 |
| 2,605,615 | Meredith et al. | Aug. 5, 1952 |

FOREIGN PATENTS

| | | |
|---|---|---|
| 524,091 | Great Britain | July 30, 1940 |